(12) United States Patent
Thorpe et al.

(10) Patent No.: US 11,346,718 B2
(45) Date of Patent: May 31, 2022

(54) SPECTRAL IMAGING SYSTEM

(71) Applicant: California Institute of Technology, Pasadena, CA (US)

(72) Inventors: Andrew K. Thorpe, Pasadena, CA (US); Robert O. Green, Palmdale, CA (US); Pantazis Mouroulis, Glendora, CA (US); David R. Thompson, Pasadena, CA (US); Andrew D. Aubrey, Austin, TX (US); Christian Frankenberg, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/658,500

(22) Filed: Oct. 21, 2019

(65) Prior Publication Data

US 2020/0124477 A1 Apr. 23, 2020

Related U.S. Application Data

(60) Provisional application No. 62/747,859, filed on Oct. 19, 2018.

(51) Int. Cl.
*G01J 3/28* (2006.01)
*G01N 21/31* (2006.01)
*G01J 3/02* (2006.01)
*G01N 21/27* (2006.01)

(52) U.S. Cl.
CPC .......... *G01J 3/2823* (2013.01); *G01J 3/0205* (2013.01); *G01N 21/274* (2013.01); *G01N 21/31* (2013.01); *G01J 2003/2866* (2013.01)

(58) Field of Classification Search
CPC ..................................................... G01J 3/2823
USPC ......................................................... 356/326
See application file for complete search history.

(56) References Cited

U.S. PATENT DOCUMENTS

| | | | | |
|---|---|---|---|---|
| 5,329,595 A | * | 7/1994 | Davies | G01C 11/02 348/144 |
| 6,480,333 B1 | | 11/2002 | Maker et al. | |
| 2006/0268947 A1 | * | 11/2006 | Kalayeh | G01N 21/39 372/20 |
| 2010/0053609 A1 | * | 3/2010 | Chrisp | G01J 3/36 356/328 |
| 2010/0238440 A1 | * | 9/2010 | Oskotsky | G01J 3/0208 356/328 |

(Continued)

OTHER PUBLICATIONS

"Instrument Incubator Program (IIP)", Greenhouse Gas Emissions Mapper, G2EM, Roses 2016, 53 pgs.

(Continued)

*Primary Examiner* — Tarifur R Chowdhury
*Assistant Examiner* — Omar H Nixon
(74) *Attorney, Agent, or Firm* — KPPB LLP

(57) ABSTRACT

A freeform imaging system with a spectrometer and telescope components optically connected and optimized to increase the spectral and spatial resolution capabilities. Many embodiments of the system are capable of producing a spectral resolution of approximately 1 nm and a spatial resolution less than 30 m such that the imaging system can be used to accurately capture and measure point source plumes of various atmospheric gases including $CH_4$, $CO_2$, CO, $N_2O$, and $H_2O$.

20 Claims, 17 Drawing Sheets

(56) References Cited

U.S. PATENT DOCUMENTS

| | | | | |
|---|---|---|---|---|
| 2012/0081705 | A1* | 4/2012 | Cook | G02B 17/082 |
| | | | | 356/328 |
| 2013/0250104 | A1* | 9/2013 | Williams | G06T 3/4061 |
| | | | | 348/144 |
| 2017/0191873 | A1* | 7/2017 | Sloan | G01J 3/26 |
| 2018/0106673 | A1* | 4/2018 | Pagano | G01J 3/36 |
| 2018/0136039 | A1* | 5/2018 | Rolland | G01J 3/0208 |
| 2019/0023424 | A1* | 1/2019 | Helvajian | B64G 1/443 |
| 2019/0339123 | A1* | 11/2019 | Farsad | G01J 3/1809 |

OTHER PUBLICATIONS

Allen, "GHG Emission Factor Development Project for Selected Sources in the Natural Gas Industry", Quarterly Progress Report, U.S. Environmental Protection Agency, report period: Jan. 1, 2011-Mar. 31, 2011, pp. 1-6.

Allen et al., "Methane Emissions from Process Equipment at Natural Gas Production Sites in the United States: Liquid Unloadings", Environmental Science & Technology, Dec. 9, 2014, vol. 49, pp. 641-648, dx.doi.org/10.1021/es504016r.

Allen et al., "Methane Emissions from Process Equipment at Natural Gas Production Sites in the United States: Pneumatic Controllers", Environmental Science & Technology, Dec. 9, 2014, vol. 49, pp. 633-640, dx.doi.org/10.1021/es5040156.

Aubrey et al., "Crosscutting Airborne Remote Sensing Technologies for Oil and Gas and Earth Science Applications", Offshore Technology Conference, May 4-7, 2015, https://doi.org/10.4043/25984-MS.

Ayasse et al., "Evaluating the effects of surface properties on methane retrievals using a synthetic airborne visible/infrared imaging spectrometer next generation (AVIRIS-NG) image", Remote Sensing of Environment, 2018, vol. 215, pp. 386-397, https://doi.org/10.1016/j.rse.2018.06.018.

Beer et al., "Tropospheric emission spectrometer for the Earth Observing System's Aura Satellite", Applied Optics, May 20, 2001, vol. 40, No. 15, pp. 2356-2367, http://dx.doi.org/10.1364/AO.40.002356.

Bender et al., "Snow and Water Imaging Spectrometer (SWIS): development of a CubeSat-compatible instrument", in Earth Observing Missions and Sensors Development, Implementation, and Characterization IV, International Society for Opticsand Photonics, May 2016, vol. 9881, 11 pgs., DOI: 10.1117/12.2228211.

Brandt et al., "Methane Leaks from North American Natural Gas Systems", Science, Feb. 14, 2014, vol. 343, Issue 6172, pp. 733-735, DOI: 10.1126/science.1247045.

Buchwitz et al., "Carbon Monitoring Satellite (CarbonSat): assessment of atmospheric $CO_2$ and $CH_4$ retrieval errors by error parameterization", Atmos. Meas. Tech., Dec. 10, 2013, vol. 6, pp. 3477-3500, doi: 10.5194/amt-6-3477-2013.

Butz et al., "Retrievals of atmospheric $CO_2$ from simulated spaceborne measurements of backscattered near-infrared sunlight: accounting for aerosol effects", Applied Optics, Jun. 20, 2009, Vo. 48, No. 18, pp. 3322-3336, published Jun. 10, 2009, DOI:10.1364/AO.48.003322.

Chung et al., "Large-Eddy Simulation of Stratified Turbulence. Part I: A Vortex-Based Subgrid-Scale Model", Journal of the Atmospheric Sciences, May 2014, vol. 71, No. 5, pp. 1863-1879, published online Apr. 28, 2014, doi: 10.1175/JAS-D-13-0126.1.

Clark et al., "USGS digital spectral library splib06a and splib06b", U.S. Geological Survey, Digital Data Series 231, 2007, 23 pgs.

Cusworth et al., "Potential of next-generation imaging spectrometers to detect and quantify methane point sources from space", Atmospheric Measurement Techniques Discussions, in review, 29 pgs., https://doi/org/10.5194/amf-2019-202.

Dennison, "Fire detection in imaging spectrometer data using atmospheric carbon dioxide absorption", International Journal of Remote Sensing, Jul. 2006, vol. 27, No. 14, pp. 3049-3055, DOI: 10.1080/01431160600660871.

Dennison et al., "High spatial resolution mapping of elevated atmospheric carbon dioxide using airborne imaging spectroscopy radiative transfer modeling and powr plant plume detection", Remote Sensing of Environment, 2013, vol. 139, pp. 116-129, http://dx.doi.org/10.1016/j.rse.2013.08.001.

Deschamps et al., "Simultaneous $CO_2$ and aerosol retrieval in a vegetation fire plume using aviris hyperspectral data", 2011 3rd Workshop on Conference Hyperspectral Image and Signal Processing: Evolution in Remote Sensing (WHISPERS), DOI: 10.1109/WHISPERS.2011.6080896.

Duren et al., "California Baseline Methane Survey Interim Phase 1 report", https://ww3.arb.ca.gOv/research/methane/ca_ch4_survey_phase1_report_2017.pdf, Oct. 1, 2017, 53 pgs.

Duren et al., "California's Methane Super-emitters", Nature, Nov. 6, 2019, vol. 575, pp. 180-184, https://doi.org/10.1038/s41586-019-1720-3.

Duren et al., "Measuring the carbon emissions of megacities", Nature Climate Change, Jul. 27, 2012, vol. 2, pp. 560-562.

Duren et al., "Understanding anthropogenic methane and carbon dioxide point source emissions", Earth Science and Applications from Space Request for Information (RFI #2), May 15, 2016, 17 pgs., http://surveygizmoresponseuploads.s3.amazonaws.com/fileuploads/15647/2604456/107-4485df83a68889ba567ac7049a4211c3_RFI2_Anthropogenic_CH4_CO2_20160515.docx.

Elder et al., "Airborne mapping reveals emergent power law of Arctic methane emissions", Geophysical Research Letters, vol. 47, e2019GL085707, pp. 1-10, https://doi.org/10.1029/2019GL085707.

EPA, "U.S. Environmental Protection Agency, Technical Report, EPA Phase II aggregate site report, cost-effective directed inspection and maintenance control opportunities at five gas processing plants and upstream gathering compressor stations and well sites", Mar. 2006, Washington, DC, 74 pgs.

EPA OAQPS, "Oil and Natural Gas Sector Leaks, Report for Oil and Natural Gas Sector Leaks", Review Panel, Apr. 2014, 63 pgs.

Frankenberg et al., "Aerosol information content analysis of multiangle high spectral resolution measurements and its benefit for high accuracy greenhouse gas retrievals", Atmospheric Measurement Techniques, Jul. 27, 2012, vol. 5, pp. 1809-1821.

Frankenberg et al., "Airborne methane remote measurements reveal fat-tail methane sources in the Four Corner region", PNAS Early Edition, 6 pgs., www.pnas.org/cgi/doi/10.1073/pnas.1605617113.

Frankenberg et al., "Assessing Methane Emissions from Global Space-Borne Observations", Science, May 13, 2005, vol. 308, Issue 5724, pp. 1010-1014, published online Mar. 17, 2005, DOI: 10.1126/science.1106644.

Frankenberg et al., "Iterative maximum a posteriori (IMAP)-DOAS for retrieval of strongly absorbing trace gases: Model studies for CH4 and CO2 retrieval from near infrared spectra of SCIAMACHY onboard ENVISAT", Atmospheric Chemistry and Physics, Jan. 12, 2005, vol. 5, pp. 9-22, doi: 10.5194/acp-5-9-2005.

Frankenberg et al., "Methane spectroscopy in the near infrared and its implication on atmospheric retrievals", Atmospheric Chemistry and Physics Discussions, May 29, 2008, vol. 8, p. 10021-10055.

Gerilowski et al., "MAMAP—a new spectrometer system for column-averaged methane and carbon dioxide observations from aircraft: instrument description and performance analysis", Atmospheric Measurement Techniques, Feb. 10, 2011, vol. 4, pp. 215-243, doi: 10.5194/amt-4-215-2011.

Green et al., "Imaging Spectroscopy and the Airborne Visible/Infrared Imaging Spectrometer (AVIRIS)", Remote Sensing of Environment, Sep. 1998, vol. 65, Issue 3, pp. 227-248, https://doi.org/10.1016/S0034-4257(98)00064-9.

Hamlin et al., "Imaging spectrometer science measurements for terrestrial ecology: AVIRIS and new developments", IEEE, paper presented at Aerospace Conference, Jan. 2011, pp. 1-7.

Hulley et al., "High spatial resolution imaging of methane and other trace gases with the airborne Hyperspectral Thermal Emission spectrometer (HyTES)", Atmospheric Measurement Techniques, Jun. 1, 2016, vol. 9, pp. 2393-2408, doi: 10.5194/amt-9-2393-2016.

Kirschke et al., "Three decades of global methane sources and sinks", Nature Geoscience (advanced online publication), Sep. 22, 2013, pp. 813-823, doi:10.1038/ngeo1955.

(56) References Cited

OTHER PUBLICATIONS

Kokaly et al., "Spectroscopic remote sensing of the distribution and persistence of oil from the Deepwater Horizon spill in Barataria Bay marshes", Remote Sensing of Environment, Feb. 15, 2013, vol. 129, pp. 210-230. https://doi.Org/10.1016/j.rse.2012.10.028.
Kort et al., "Emissions of CH4 and N2O over the United States and Canada based on a receptor-oriented modeling framework and COBRA-NA atmospheric observations", Geophysical Research Letters, vol. 46, L18808, 5 pgs., doi: 10.1029/2008GL034031.
Kort et al., "Four corners: the largest US methane anomaly viewed from space", Geophysical Research Letters, Sep. 16, 2014, pp. 1-6, doi: 10.1002/2014GL061503.
Krautwurst et al., "Methane emissions from a Californian landfill, determined from airborne remote sensing and in situ measurements", Atmospheric Measurement Techniques, Dec. 2016, pp. 1-33, DOI: 10.5194/amt-2016-391.
Krings et al., "MAMAP—a new spectrometer system for column-averaged methane and carbon dioxide observations from aircraft: retrieval algorithm and first inversions for point source emission rates", Atmospheric Measurement Techniques, Sep. 6, 2011, vol. 5, pp. 1735-1758, doi: 10.5194/amt-4-1735-2011.
Krings et al., "Quantification of methane emission rates from coal mine ventilation shafts using airborne remote sensing data", Atmospheric Measurement Techniques, Jan. 30, vol. 6, pp. 151-166, https://doi.org/10.5194/amt-6-151-2013.
Marion et al., "Measuring trace gases in plumes from hyperspectral remotely sensed data", IEEE Transactions on Geoscience and Remote Sensing, Apr. 2004, vol. 42, No. 4, pp. 854-864, DOI: 10.1109/TGRS.2003.820604.
Matheou et al., "A recycling method for the large-eddy simulation of plumes in the atmospheric boundary layer", Environmental Fluid Mechanics, May 17, 2015, vol. 16, pp. 69-85, DOI:10.1007/s10652-015-9413-4.
Matheou et al., "Large-Eddy Simulation of Stratified Turbulence. Part II Application of the Stretched-Vortex Model to the Atmospheric Boundary Layer", Journal of the Atmospheric Sciences, Dec. 2014, vol. 71, pp. 4439-4460, published online Nov. 26, 2014, https://doi.org/10.1175/JAS-D-13-0306.1.
Miller et al., "Anthropogenic emissions of methane in the United States", PNAS, Dec. 10, 2013, vol. 110, No. 50, p. 20018-20022, www.pnas.org/cgi/doi/10.1073/pnas.1314392110.
Miller et al., "China's coal mine methane regulations have not curbed growing emissions", Nature Communications, Jan. 29, 2019, vol. 10, No. 303, pp. 1-8, https://doi.org/10.1038/s41467-018-07891-7.
Mouroulis et al., "Landsat swath imaging spectrometer design", Optical Engineering, vol. 55, No. 1, 015104 (2016), p. 015104-1-015104-11, https://doi.org/10.1117/1.OE.55.1.015104.
Mouroulis et al., "Optical design of a CubeSat-compatible imaging spectrometer", Proc. SPIE 9222, Imaging Spectrometry XIX, Sep. 15, 2014, 92220D, 8 pages, doi: 10.1117/12.2062680.
Mouroulis et al., "Optical design of a refluctance/Raman confocal microspectrometer", Current Developments in Lens Design and Optical Engineering III, Oct. 16, 2002, vol. 4767, pp. 123-130, http://dx.doi.org/10.1117/12.451229.
Mouroulis et al., "Portable Remote Imaging Spectrometer coastal ocean sensor: design, characteristics, and first flight results", Applied Optics, Mar. 2, 2014, vol. 53, No. 7, pp. 1363-1380, published Feb. 26, 2014, http://dx.doi.org/10.1364/AO.53.001363.
Mouroulis et al., "Review of high fidelity imaging spectrometer design for Yemote sensing", Optical Engineering, Apr. 2018, vol. 57, No. 4, p. 040901-1-040901-19.
Myhre et al., "Anthropogenic and natural radiative forcing. In: Climate change 2013: The physical science basis", Climate change 2013: The physical science basis, Contribution of Working Group I To the Fifth Assessment Report of The Intergovernmental Panel on Climate Change (p. 1535), Cambridge University Press, pp. 659-740, http://dx.doi.org/10.1017/CBO9781107415324.
Peterson et al., "Oil detection in the coastal marshes of Louisiana using MESMA applied to band subsets of AVIRIS data", Remote Sensing of Environment, Mar. 15, 2015, vol. 159, pp. 222-231, https://doi.org/10.1016/j.rse.2014.12.009.
Platt et al., "Differential optical absorption spectroscopy: principles and applications", Berlin Heidelberg: Springer-Verlag, 2008, 608 pgs., (presented in three parts).
Roberts et al., "Mapping methane emissions from a marine geological seep source using imaging spectrometry", Remote Sensing of Environment, Mar. 15, 2010, vol. 114, No. 3, pp. 592-606, https://doi.org/10.1016/j.rse.2009.10.015.
Spinetti et al., "Carbon dioxide of Pu'u'O'o volcanic plume at Kilauea Yetrieved by AVIRIS hyperspectral data", Remote Sensing of Environment, Jun. 16, 2008, vol. 112, Issue 6, pp. 3191-3199, http://dx.doi.org/10.1016/j.rse.2008.03.010.
Stephan et al., "MERLIN—a space-based methane monitor", Lidar Remote Sensing for Environmental Monitoring XII, Sep. 13, 2011, vol. 8159, http://dx.doi.org/10.1117/12.896589.
Sullivan et al., "Characterization of the Teledyne CHROMA HgCdTe Detector for Imaging Spectrometers", IEEE Aerospace Conference, 2017, pp. 1-7.
Thompson et al., "Real-time remote detection and measurement for airborne imaging spectroscopy: a case study with methane", Atmospheric Measurement Techniques, Oct. 19, 2015, vol. 8, pp. 4383-4397, doi: 10.5194/amt-8-4383-2018.
Thompson et al., "Space-based remote imaging spectroscopy of the Aliso Canyon CH4 super-emitter", Geophysical Research Letters, Jun. 28, 2016, vol. 43, Issue 12, pp. 6571-6578, first published May 28, 2016, https://doi.org/10.1002/2016GL069079.
Thorpe et al., "Point source emissions mapping using the Airborne Visible/lnfrared Imaging Spectrometer (AVIRIS)", Proceedings of SPIE—The International Society for Optical Engineering, May 2012, vol. 8390, p. 839013-1-839013-9, DOI: 10.1117/12.918958.
Thorpe et al., "Airborne DOAS retrievals of methane, carbon dioxide, and water vapor concentrations at high spatial resolution: application to AVIRIS-NG", Atmospheric Measurement Techniques, Oct. 19, 2017, vol. 10, pp. 3833-3850, doi: 10.5194/amt-10-3833-2017.
Thorpe et al., "Attributing methane emissions to point source locations using the next generation Airborne Visible-Infrared Imaging Spectrometer (AVIRIS)", 11th International Workshop on Greenhouse Gas Measurements from Space IWGGMS-11, Pasadena, CA 2015, 1 pg.
Thorpe et al., "High resolution mapping of methane emissions from marine and terrestrial sources using a Cluster-Tuned Matched Filter technique and imaging spectrometry", Remote Sensing of Environment, Jul. 2013, vol. 134, pp. 305-318, https://doi.org/10.1016/j.rse.2013.03.018.
Thorpe et al., "Mapping methane concentrations from a controlled release experiment using the next generation airborne visible/infrared imaging spectrometer (AVIRIS-NG)", Remote Sensing of Environment, Jun. 15, 2016, vol. 179, pp. 104-115, https://doi.org/10.1016/j.rse.2016.03.032.
Thorpe et al., "Retrieval techniques for airborne imaging of methane concentrations using high spatial and moderate spectral resolution: Application to AVIRIS", Atmospheric Measurement Techniques, Feb. 10, 2014, vol. 7, pp. 491-506, DOI: 10.5194/amt-7-491-2014.
Thorpe et al., "The Airborne Methane Plume Spectrometer (AMPS) Quantitative imaging of methane plumes in real time", IEEE Aerospace Conference, 2016, 27 pgs.
Tratt et al., "Airborne visualization and quantification of discrete methane sources in the environment", Remote Sensing of Environment, Nov. 2014, vol. 154, pp. 74-88, https://doi.org/10.1016/j.rse.2014.08.011.
Turner et al., "Interpreting contemporary trends in atmospheric methane", PNAS, Feb. 19, 2019, vol. 116, No. 8, pp. 2805-2813; first published Feb. 7, 2019, https://doi.org/10.1073/pnas.1814297116.
Van Gorp et al., "Design of the Compact Wide Swath Imaging Spectrometer (CWIS)", Proceedings vol. 9222, Imaging Spectrometry XIX, Sep. 15, 2014; vol. 92220, p. 092220C-1-092220C-9, https://doi.org/10.1117/12.2062886.
Van Gorp et al., "Ultra-compact imaging spectrometer for remote, in situ, and microscopic planetary mineralogy", Journal of Applied

(56) References Cited

OTHER PUBLICATIONS

Remote Sensing, 2014, vol. 8, No. 1, p. 084988-1 084988-16, published online Apr. 25, 2014, https://doi.org/10.1117/1.JRS.8.084988.

Veefkind et al., "TROPOMI on the ESA Sentinel-5 Precursor: A GMES mission for global observations of the atmospheric composition for climate, air quality and ozone layer applications", Remote Sensing of Environment, May 15, 2012, vol. 120, pp. 70-83, doi: 10.1016/j.rse.2011.09.027.

Worden et al., "Profiles of CH4, HDO, H2O, and N2O with improved lower tropospheric vertical resolution from Aura TES radiances", Atmospheric Measurement Techniques, Feb. 20, 2012, vol. 5, pp. 397-411. http://dx.doi.org/10.5194/amt-5-397-2012.

Yokota et A., "A nadir looking SWIR FTS to monitor CO2 column density for Japanese GOSAT project", 24th International Symposium of Space Technology and Science (Selected Papers), JSASS and Organizing Comm. of the 24th ISTS, pp. 887-889.

\* cited by examiner

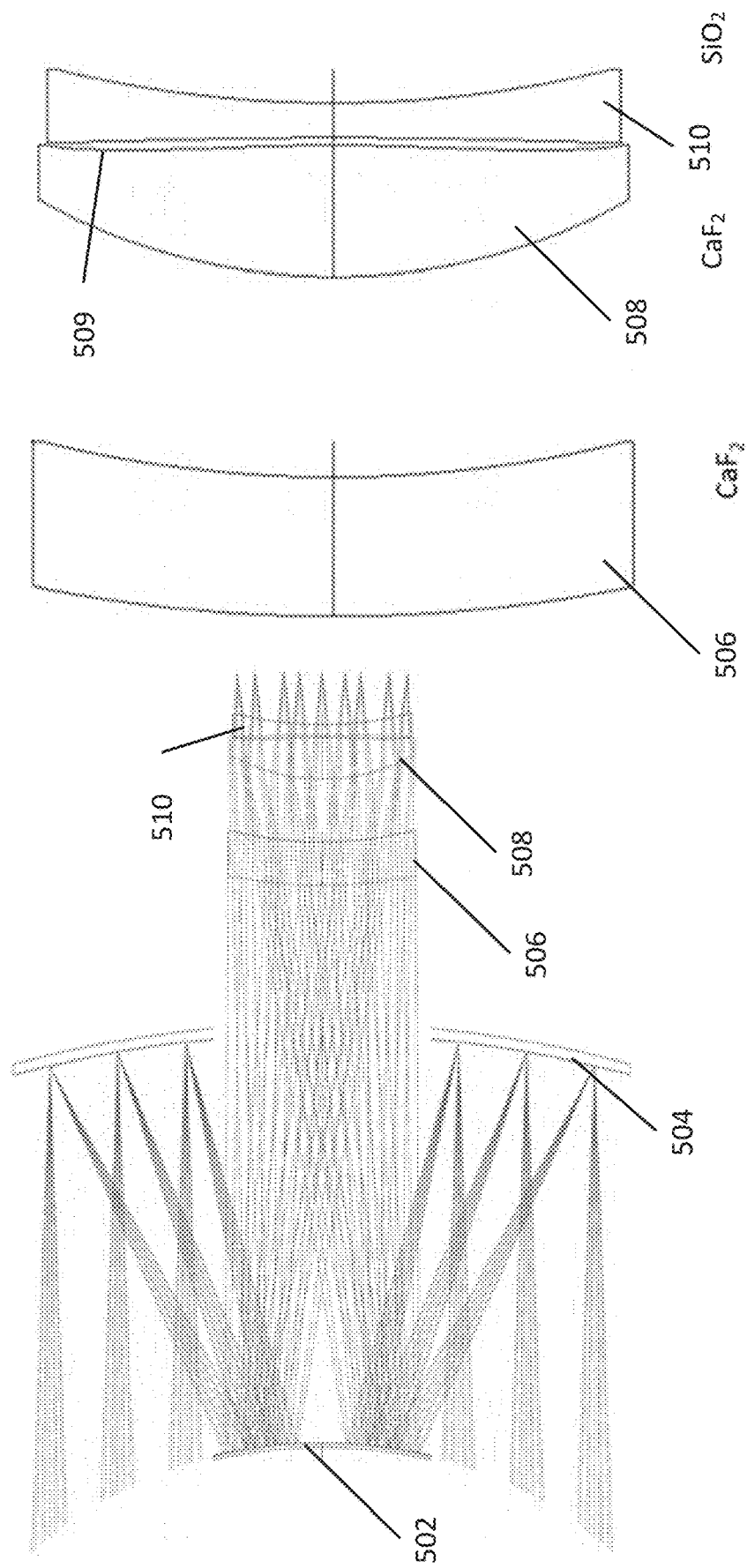

Fig. 7A

| Specifications of Spectrometers | |
|---|---|
| Parameter | Value(s) |
| Spectral Range in frequency (nm) | 2000-2400 |
| Spectral Sampling (nm) | 0.5 |
| Spatial Sampling | 1mrad |
| Detector Pixel (μm) | 18X18 |
| Spatial Pixels | 3000 |
| F-number | 4 |
| Spot energy in pixel | >83% (.95% of diffraction limit) |
| Uniformity | >90% |
| Grating pitch (μm) | 2.58 |
| Form factor (optics) | 90x90x190 mm |

| Parameter Value | Design 1 | Design 2 | Design 3 |
|---|---|---|---|
| Spectral range (nm) | 1,930 to 2,420 | 2,000 to 2,400 | 2,000 to 2,400 |
| Spectral sampling (nm) | 1 | 1 | 1 |
| Number of spatial pixels | 600 | 1,240 | 3,000 |
| Spatial resolution | As low as 10 cm (helicopter) | ~10-30 m (satellite) | ~10-30 m (satellite) |
| Size (spectrometer) | ~6,480 cm3 | ~1,050 cm3 | ~1,050 cm3 |
| Size (telescope) | Dependent on desired flight altitude | 4 times larger than the FIS telescope | 1/4th the size of the G2EM telescope |
| Gas sensitivities | $CH_4$, $CO_2$, CO, $N_2O$, $H_2O$ | $CH_4$, $CO_2$, CO, $N_2O$, $H_2O$ | $CH_4$, $CO_2$, CO, $N_2O$, $H_2O$ |
| Spectrometer type | Dyson | Littrow-Offner | Littrow-Offner |
| Optics | Spherical optics in spectrometer | Freeform optics in spectrometer | Freeform optics in spectrometer and telescope |
| Platform | Airborne | Spaceborne | Spaceborne (as well as airborne) |
| Additional notes | | Not CubeSat compatible given large telescope | Cubesat compatible (24U or smaller) |
| Additional notes | | Analog Teledyne detector | Digital Teledyne detector |

Fig. 7B

SPECTRAL IMAGING SYSTEM

CROSS-REFERENCED APPLICATIONS

This application claims priority to U.S. Provisional Patent Application No. 62/747,859 filed on Oct. 19, 2018. The enclosure of which is included herein by reference in its entirety.

This invention was made with government support under Grant No. 80nm0018d004 awarded by NASA (JPL). The government has certain rights in the invention.

FIELD OF THE INVENTION

The present invention generally relates to imaging systems with spectrometers and various derivatives for use in the increased ability to detect atmospheric gases with such systems.

BACKGROUND OF THE INVENTION

Greenhouse gas emissions have become an increasing area of interest on a global scale due to their potential harm to the global climate and atmosphere. Each gas can present particular dangers and risks. For example, Carbon Dioxide ($CO_2$) and Methane ($CH_4$) emissions represent a particular risk to atmospheric integrity and the overall climate. As a result, these gases are of particular interest to the scientific community in terms of measurement and determination of the particular emission sources of such gases.

Methane ($CH_4$) emissions, for example, although smaller than Carbon Dioxide, pose a particular risk to the global climate due to the increased ability for methane to warm the atmosphere. Atmospheric methane is the second most important anthropogenic greenhouse gas, exhibiting direct radiative forcing as well as indirect forcing through impacts on tropospheric ozone and stratospheric water vapor. Emissions from industrial sources such as oil and gas industries represent a significant portion of the global methane budget. Accordingly, the ability to map such emissions or determine the locations of such emissions can be beneficial in preventing unwanted $CH_4$ emissions. For the regulatory and scientific communities, understanding the distribution (spatial, temporal) and size of these emissions is of interest given the large uncertainties associated with anthropogenic emissions, including industrial point source emissions and fugitive methane from oil and gas infrastructure. The ability to map methane emissions to individual point source locations allows site operators to identify and mitigate these emissions, which reflect both a potential safety hazard and lost revenue.

Spectrometers have been used in various applications in an attempt to monitor greenhouse gases. Spectrometers are instruments that utilize the properties and function of light to separate out and measure a variety of spectral components and physical phenomenon. For example, mass spectrometers can measure the spectrum of masses of atoms or molecules present in a substance. Additionally, spectrometers have the ability to measure and determine the chemical composition which has continued drive their use in many areas of science such as physics, astronomy, and chemistry. Spectrometers, such as optical spectrometers, typically involve multiple components such as telescopes, optical lenses, gratings, and detectors. They can use a grating or prism to spread light from a distant object over a certain spectrum and direct the spectrum of light to a detector for measurement and evaluation. The spreading of the light can allow the detection of elements by their various "spectral fingerprints." This can allow users to determine the exact concentration of such elements in a measured substance like the atmosphere.

Telescopic imagers have also been used in traditional scientific settings. Imagers have the capability to image portions of the earth at any given time and have been applied in many situations to aid in discovering various topographies and potential locations of greenhouse gas emissions. The variations of elements and overall variations of spectrometers and telescopic imagers allow researchers and scientists to implement spectrometers in large array of devices that can be used for a variety of purposes. For example, satellites as well as medical devices. Additionally, with the increase of carbon based emissions leading to such issues like climate change, many researchers may utilize spectrometers to determine the level of such emissions present in a given area. The continuously changing environment helps to fuel the continued use and development of spectrometers and their use in conjunction with a variety of other components.

BRIEF SUMMARY OF THE INVENTION

Many embodiments are directed to an imaging system that maximizes the functionalities of high spectral and spatial resolution in order to accurately detect and discern point source gas plumes of various atmospheric gases.

Many embodiments include an imaging system that has a telescopic component having a plurality of reflective and refractive elements disposed within a body of the telescopic component such that the reflective and refractive elements receive light images from a desired location. The light images are in the form of light rays transmitted through the telescopic component. Additionally, many embodiments utilize a freeform surface on at least one surface of at least one of the refractive elements. Additionally, embodiments utilize a spectrometer optically coupled to the telescopic component that also has one or more spectral reflective elements that receive the light from the telescopic element and redirect the light to a detector array such that the imaging system operates within a spectral frequency range. At least one of the spectral reflective elements has a freeform reflective surface, and the detector array has a number of pixels corresponding to a spatial resolution that is detected from the telescopic component such that the spatial resolution can result in an optimized image. A focal plane array is also used that has multiple electronic components disposed within a housing and electro-optically connected to the spectrometer and configured to receive light image data from the optically connected telescope and spectrometer and convert the light image data into a data stream.

In other embodiments, the system is configured to detect atmospheric gases.

In still other embodiments, the atmospheric gases are selected from a group consisting of $CH_4$, $CO_2$, $CO$, $N_2O$, and $H_2O$.

In yet other embodiments, the spectrometer is selected from a group consisting of Littrow, Littrow-Offner, Dyson type, slit-scan, and raster scan.

In still yet other embodiments, the focal plan array is a CHROMA-D focal plane array.

In other embodiments, the system is configured to fit within a form factor of a CubeSat.

In still other embodiments, the system is configured to fit within a form factor of a SmallSat.

In yet other embodiments, the number of spatial pixels is selected from a group consisting of 600, 1240, and 3000.

In still yet other embodiments, the spectral frequency range is from 1990 to 2400.

In other embodiments, the spectral frequency range is from 2000 to 2400.

In yet other embodiments, the imaging system has a spectral resolution of 1 nm and a spatial resolution of less than 30 m.

In still other embodiments, the spatial resolution is between 10 and 30 m.

In still yet other embodiments, the refractive elements of the telescopic element make up a refractive corrector that redirects or corrects incoming light ray paths to a desired path within the telescopic component.

In other embodiments, the system is disposed on a satellite platform.

In other embodiments, the system is disposed on an airborne transportation device and configured to receive light images along a predetermined flight path.

In still other embodiments, the system is configured to determine point source locations by way of the incoming light images of a point source plume of the atmospheric gas.

Other embodiments include a method for detecting atmospheric gases that uses an imaging system wherein the imaging system has a telescopic component having a plurality of reflective and refractive elements disposed within a body of the telescopic component such that the reflective and refractive elements receive light images from a desired location. The light images are in the form of light rays transmitted through the telescopic component. Additionally, many embodiments utilize a freeform surface on at least one surface of at least one of the refractive elements. Additionally, embodiments utilize a spectrometer optically coupled to the telescopic component that also has one or more spectral reflective elements that receive the light from the telescopic element and redirect the light to a detector array such that the imaging system operates within a spectral frequency range. At least one of the spectral reflective elements has a freeform reflective surface, and the detector array has a number of pixels corresponding to a spatial resolution that is detected from the telescopic component such that the spatial resolution can result in an optimized image. A focal plane array is also used that has multiple electronic components disposed within a housing and electro-optically connected to the spectrometer and configured to receive light image data from the optically connected telescope and spectrometer and convert the light image data into an analog data stream. The images are subsequently analyzed for the detection of a particular atmospheric gas and the location of the source of the atmospheric gas.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 5A-5D illustrate a modified Cassegrain telescopic component configuration in accordance with embodiments.

FIGS. 7A and 7B are tabular illustrations of parameters of spectrometer and telescopic components in accordance with embodiments.

DETAILED DESCRIPTION OF THE INVENTION

Figure 1:
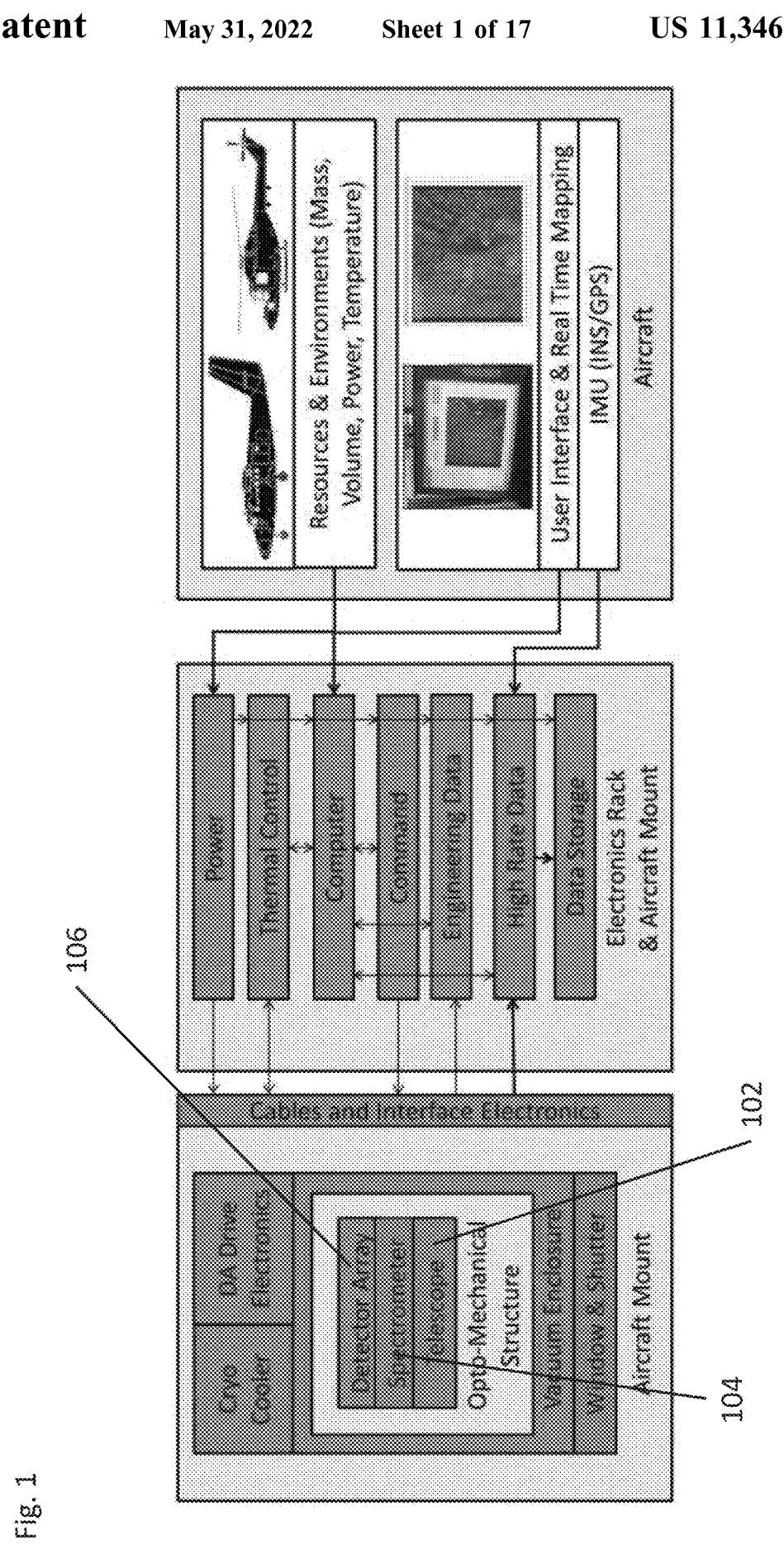
FIG. 1 illustrates block diagram of system for measuring atmospheric gas emissions in accordance with embodiments.

Turning now to the drawings, many embodiments are directed to an imaging system containing telescopic and spectrometer components that are configured to measure atmospheric gases with a high spatial and high spectral resolution. Many embodiments include the use of optical elements within a telescopic component that contain freeform reflective elements that aim to reduce the focal length and thereby allow for reduced form factor packaging. Such embodiments can allow for improved detection and point source location of atmospheric gases such as methane.

Atmospheric methane ($CH_4$) is the second most important anthropogenic greenhouse gas, exhibiting direct radiative forcing as well as indirect forcing through impacts on tropospheric ozone and stratospheric water vapor. Although the major components of the global $CH_4$ budget have been identified, their relative contributions to atmospheric $CH_4$ are highly uncertain at the global scale and effectively unknown at regional and local scales. Both the levelling off in atmospheric abundances at the beginning of the century as well as the renewed growth since 2007 are not yet well understood, underscoring significant gaps in our understanding of the global $CH_4$ budget. As of 2014, the growth rate is even further accelerating.

Unlike carbon dioxide ($CO_2$), both the anthropogenic and natural contributions to the total $CH_4$ budget are highly uncertain. The existing inventories of fossil fuel sales and/or combustion that make anthropogenic $CO_2$ emissions relatively easy to track, do not exist for anthropogenic $CH_4$ because emissions mainly originate from biological processes, venting, and/or leaks. Identifying high emitters from atmospheric observations can lead to effective mitigation because of economic as well as environmental incentives.

Many of the uncertainties of the fluctuation of $CH_4$ emissions can be in part due to the in ability to accurately determine the point source of the emissions. Various methods of testing have been used, including Aircraft in-situ measurements which can provide point source or regional estimates, but such methods are costly and time consuming, and lack contiguous spatial coverage. Owing to limitations in the spatial resolution of satellite observations and the sparse coverage of ground stations, these methods of discover and detection only work on coarse regional scales (~100-1,000 km). The coarseness of such will not change even if additional instruments are added.

Some uses of airborne imaging spectroscopy can be successful at illustrating industrial point sources, however, there are significant shortcomings for trace gas retrievals which can result in ambiguous findings due to interferences from surface spectroscopy and limited detection thresholds. In general, the use of surface spectroscopy and atmospheric remote sensing does not coincide due to the vastly differing mission requirements related to the tradeoff between spatial and spectral resolutions. For example, surface remote sensing prefers spatial resolution over spectral resolution. Spatial resolution refers to the number of independent pixels per unit of length that are used in the construction of the image. Thus, images with higher spatial resolution have a greater number of pixels than those with lower spatial resolution.

In contrast to the optimal outcome of surface sensing (high spatial resolution), atmospheric trace gas remote sensing requires higher spectral resolution to isolate the atmospheric trace gases. This often results in poor or reduced spatial resolution due to signal-to-noise requirements. Although some imaging spectrometers have illustrated some sensitivity to atmospheric gas detection, none of them are capable of detecting point source locations of small leaks because they cannot decouple atmospheric absorption features from spectral interferences caused by surface spectroscopy which results in a higher likelihood of spurious signals and reduced sensitivity to $CH_4$. Likewise, spectrometers that are optimized for methane detection do not have imaging capabilities and cannot identify the locations of individual point source emissions. Accordingly, many embodiments are directed to systems and methods capable of capitalizing on the advantages of both systems having high spatial and high spectral resolution for characterizing atmospheric gas plumes from point source locations based on airborne and space based applications.

Figure 2:
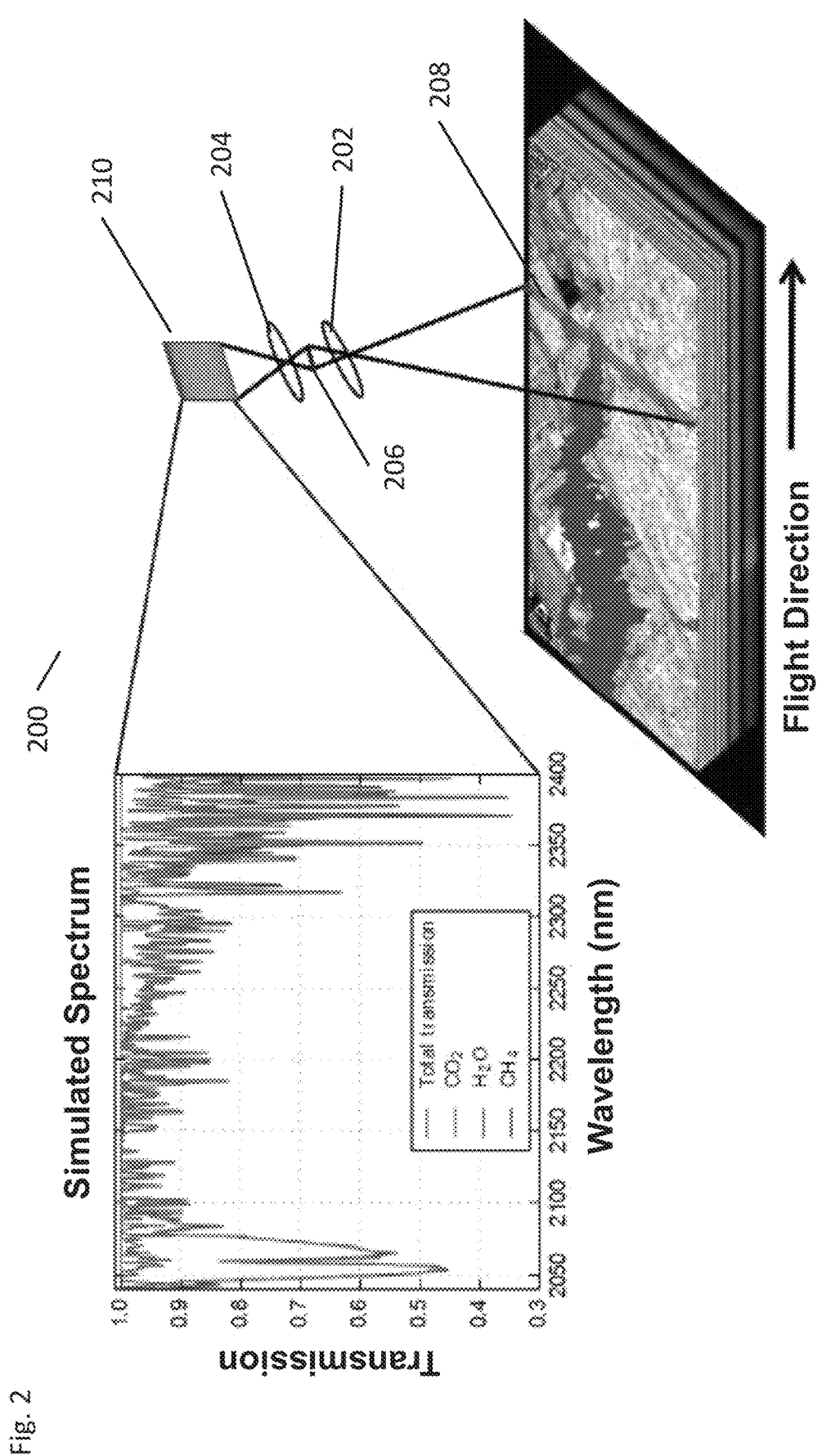
FIG. 2 illustrates a spectrum mapping resolution in accordance with embodiments.

Turning now to FIGS. 1 and 2 respectively many embodiments may be implemented in a number of methods and configurations. For example, FIG. 1 illustrates a block diagram of an embodiment of an imaging system that is capable of scanning sections of the earth over the course of a specified flight path. In many embodiments, the system is composed of a variety of components that enable it to capture accurate measures of point source gas plumes and distinguish the point source plumes. Accordingly, many embodiments have a frame work that houses the various components such as a telescope 102, a spectrometer 104, and a detector array 106. Other embodiments may include additional elements and/or configurations to accomplish the task. Additionally, many embodiments may be configured to be installed or used on some type of vehicle. Some vehicles may include airplanes, helicopters, and/or drones. Other embodiments, may utilize space based configurations to capture the images of gas plumes.

One example of an embodiment of an imaging system can be illustrated in FIG. 2. FIG. 2. Shows an embodiment of an imaging system 200 and a simulated spectrum of measurements that may be provided by such embodiments. Accordingly, the embodiment illustrates a telescope component 202 that is optimized for scanning and imaging the section of the earth. The telescope component 202, in many embodiments, is optically connected to a spectrometer 204, where the spectrometer 204 can be optimized for detecting a specific atmospheric gas such as $CH_4$ or $CO_2$. In accordance with many embodiments, the system 200 may be designed to cover a certain area that corresponds to a slit 206 in the system 200. The slit 206 operates to control the amount of light that is measured and corresponds to a slit projection 208 on the ground.

Upon receipt of the image, many embodiments incorporate the use of a detector array 210 that is configured to capture the desired image. In accordance with many embodiments, the detector array 210 may be a linear array or an area array. A linear array, in accordance with some embodiments, may provide for a more accurate calibration of components while minimizing the number of artifacts that tend to plaque area array detectors. Additionally, the detector array may be made up of any number of pixels and/or pixel sizes that allow for the maximum capture of light as well as maximizing the spatial resolution of the system. In accordance with many embodiments, the system may be configured to obtain a spatial resolution of 30 m or less. Other embodiments may have a spatial resolution of 60 m or less. In accordance with some embodiments, the spatial resolution may be between 10 and 30 m.

Turning now to FIGS. 3 through 5D embodiments of a telescopic component of an imaging system can be illustrated. The telescopic component can take on any number of forms and be configured to generate the desired measurement capabilities with respect to atmospheric gases as described. In order to best optimize the telescopic component, various principles can and should be considered. For example, embodiment designs should take into account transverse chromatic aberration, minimum variation of response with wavelength, maximum transmission, and reduced size. Additionally, the speed of optical transmission should be considered in order to best optimize the telescopic component to allow for the accurate reading of point source gas plumes and their individual makeups.

Figure 3:
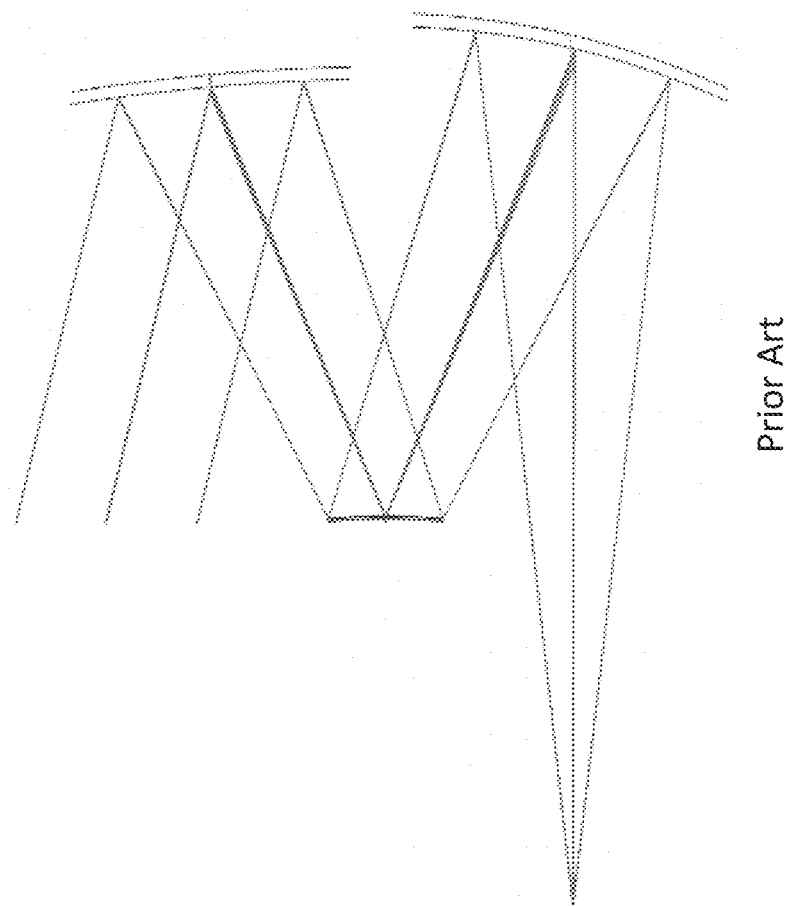
FIG. 3 illustrates a three-mirror telescopic component configuration in accordance with prior art.
Figure 4B:
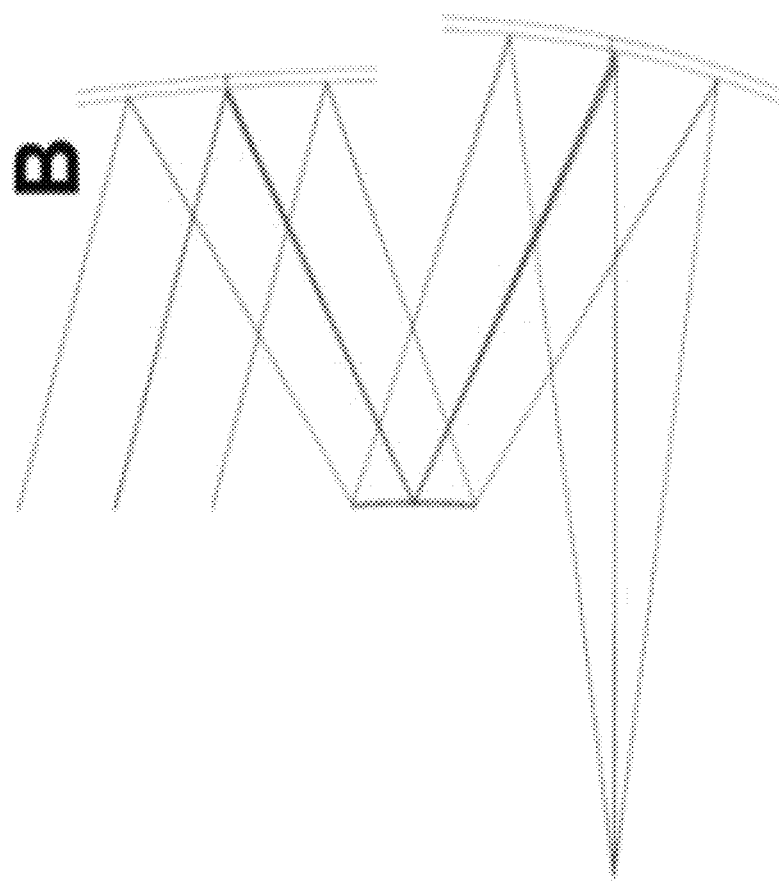
FIGS. 4A and 4B illustrate a comparison between a Cassegrain and a three-mirror telescopic configuration.
Figure 4A:
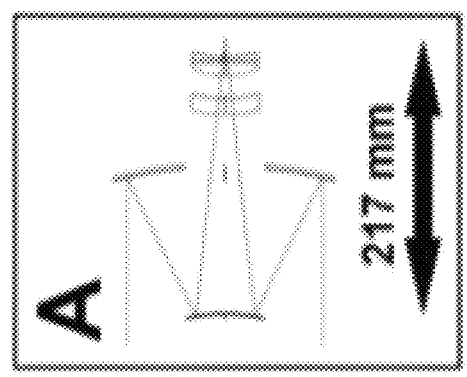

In some embodiments the telescopic component can take on any number of forms and be composed of a variety of reflective and refractive elements. For example, FIG. 3 illustrates a typical layout of a three-mirror telescopic arrangement. Many embodiments may incorporate a modified three-mirror arrangement. Additionally, many embodiments may utilize a Cassegrain configuration that can improve the dimensional characteristics of the telescope. For example, FIGS. 4A and 4B illustrate a comparison between a Cassegrain 4A and a three-mirror configuration 4B. As illustrated the three-mirror configuration 4B is much larger than the Cassegrain 4A configuration. Accordingly, many embodiments can benefit from the Cassegrain configuration due to the reduced size that ultimately affects the form factor of the overall system. Some embodiments offer an optically fast wide-field telescopic component which could be accomplished with a three-mirror or Cassegrain configuration.

As previously discussed, increased spatial and spectral resolution are important to the ability of the system to accurately detect the point source gas plumes. As such, many embodiments are optimized at the component and system levels to maximize the resolution properties of the overall system. In some embodiments, the telescopic component may be optimized within a Cassegrain design such as those illustrated in FIGS. 5A through 5D. FIG. 5A, for example, illustrates a Cassegrain telescope component design 500 with a refractive corrector 502. Such designs have been shown to allow for controlling the size of the system when the focal length is long. The refractive corrector 502 can provide a telecentric output and can take advantage of the slit field and utilize anamorphic (bionic) surface to achieve important aberration reduction. Accordingly, the corrector elements can be optimized in size, shape, configuration, and composition to improve the optics of the telescopic component. For example, many elements (refractive and reflective) may be made of metallic material and or glass like materials. Some embodiments may utilize aluminum or silica glass materials in the fabrication of the telescopic component in order to improve functionality as well as reduce cost and size.

Figure 5B:
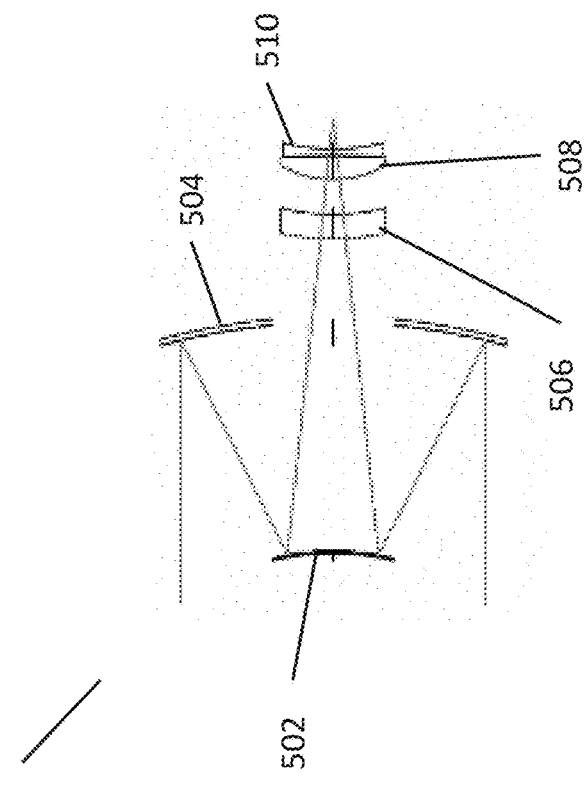
Figure 5A:
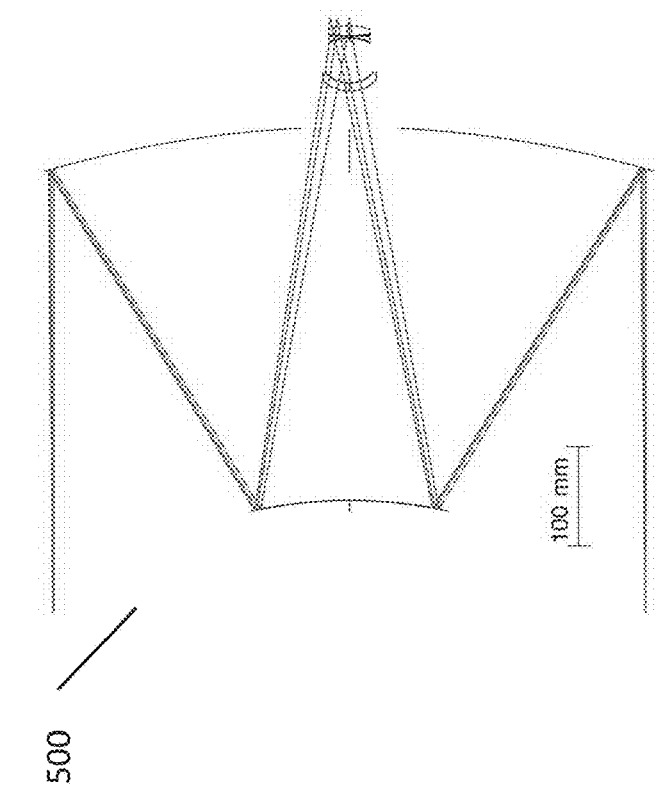

Turning now to FIGS. 5B through 5D embodiments of a Cassegrain telescopic component are illustrated. FIG. 5B illustrates the basic elements of the Cassegrain configuration with a refractive corrector (506-510). FIG. 5B illustrates an embodiment of telescope that would be optically connected to embodiments of a spectrometer. Embodiments of the telescope may contain various reflective mirror components (502 & 504) in conjunction with a refractive corrector (506-510). The reflective components as well as the refractive corrector may be optimized in size and composition as well as take advantage of the freeform design. Accordingly, many embodiments of the refractive corrector (506-510) may contain one or more components that have a freeform surface that can better be illustrated in greater detail in FIG. 5D. Embodiments similar to those illustrated in FIGS. 5B through 5D may utilize freeform surfaces and elements that can allow for an additional reduction in form factor. For example, embodiments illustrated in FIGS. 5B through 5D can range in overall size but may be as small as 217 mm in overall focal length. Embodiments that may incorporate a traditional three-mirror configuration may fit within a 600 mm focal length. Accordingly, many embodiments may vary in size in accordance with optical design characteristics.

In accordance with many embodiments, telescope designs may be modified with freeform optical components to allow for the reduction in size. For example, some embodiments may modify a traditional Cassegrain telescope design with free form elements to help further reduce the size while maintaining the imaging capabilities of the telescope. Therefore, the overall functionality of increased spatial and spectral resolution for improved gas detection can be maintained. FIGS. 5A and 5B, for example, illustrate a detailed image of a Cassegrain telescope that has modified freeform optics.

Figures 6A, 6B:
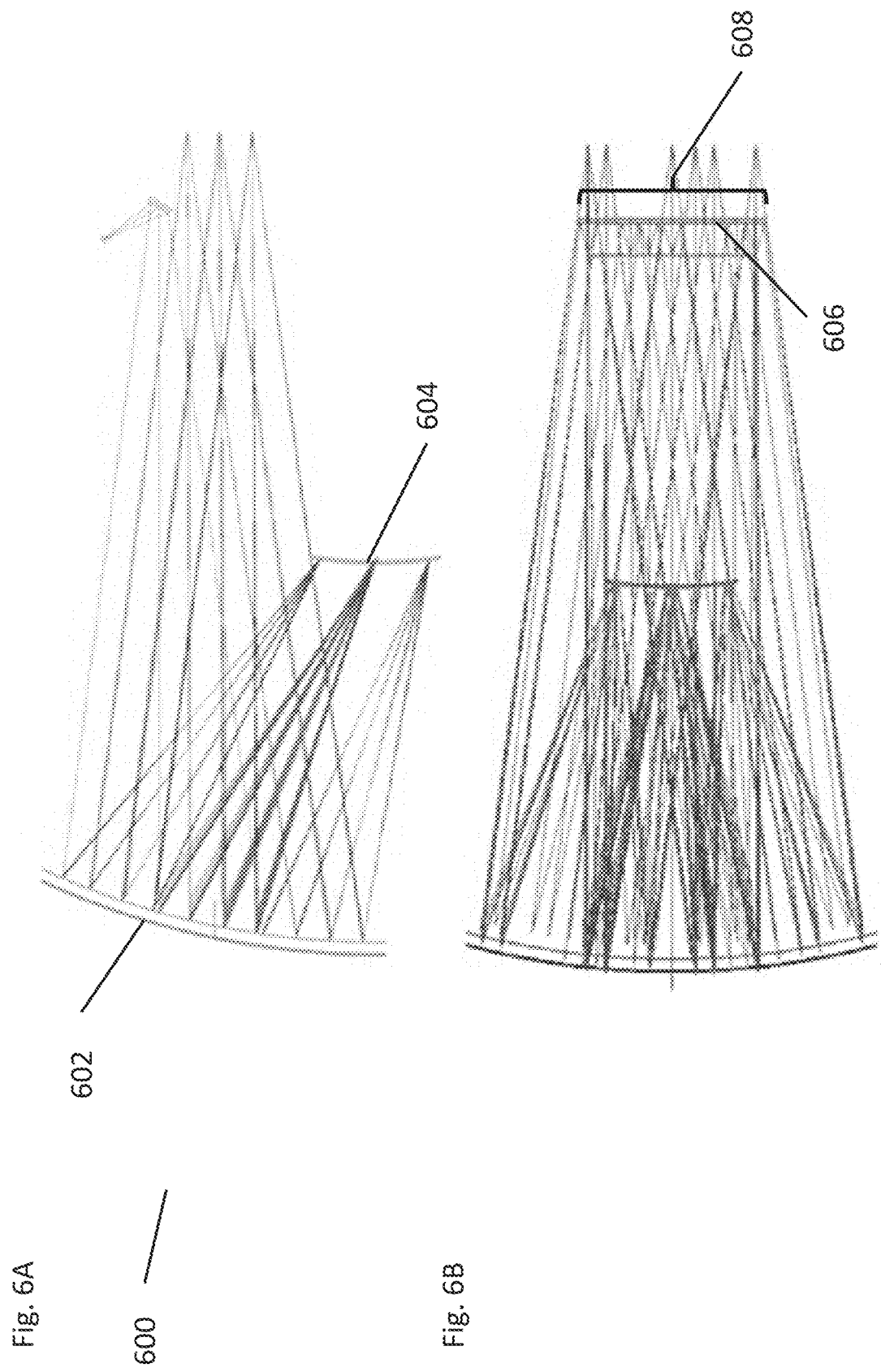
FIGS. 6A and 6B illustrate additional spectrometer configurations in accordance with embodiments.

Much like FIG. 5B, FIG. 5C illustrates an embodiment of a Cassegrain telescope configuration with reflective mirror elements (502 & 504) in conjunction with a refractive corrector (506-510). The refractive corrector (506-510), in many embodiments can have one or more lenses (506, 508, and 510) that are designed to compensate or correct the incoming light such that it moves or is directed along a desired path within the system. In accordance with many embodiments, the telescope's refractive corrector (506-510) may have lenses that have freeform surfaces 509 manufactured into the lens itself. The freeform surface can help to reduce the overall number of components within the telescope while still maintaining the functionality of the telescope by having a specially designed surface in accordance with the output specifications of embodiments of the imaging system. For example, the freeform lens can be adapted to redirect light to a specific focal point without the reliance on additional refractive elements thus reducing the complexity and size of the overall system. Additionally, the refractive corrector elements (506-510) can be made from any number of suitable materials including Calcium fluoride ($CaF_2$) and Silicon dioxide ($SiO_2$). Although a freeform modified Cassegrain configuration is illustrated, it should be understood that any number of telescope designs can be used such that the desired functional and form factor characteristics are met Turning our attention now to the spectrometer component of embodiments of the imaging system. Similar to that of the telescopic component, the spectrometer can be optimized to achieve the desired output characteristics of the system to enable the improved resolution for accurately detecting atmospheric gases. Additionally and similarly, the spectrometer component can be made up of a number of reflective and/or refractive components. FIGS. 7A through 6B illustrate various embodiments of spectrometer designs capable of improving the spatial and spectral resolution of the imaging system.

Turning now to FIGS. 6A and 6B, many embodiments offer an improved spectral resolution by modifications to the optical elements within the spectrometer. Such improvements not only offer the improved capability of detection of atmospheric gases by increasing the spectral resolution, but can also provide for reduced form factor to allow for the implementation of such embodiments in a variety of modules such as CubeSats and other airborne applications. Furthermore, many embodiments offer improved uniformity in departing from a strictly concentric approach by repositioning mirrors at different distances from the grating. For example, FIG. 6A illustrates an embodiment of a high resolution optical design spectrometer element 600 with a freeform mirror 602 configured to direct light through a grating element 604 such that it can be directed to a detector array (not shown). Freeform, as discussed above, refers to the surface configuration of the reflective or refractive element within the system. Traditional systems have used rotationally symmetric surfaces to redirect the light within the system. Accordingly, such limitations can require multiple reflective and/or refractive elements with similar symmetrical configurations to redirect the light along a desired path within the spectrometer and/or the telescope elements. Freeform elements or surfaces operate on a principle of customization of the reflective or refractive element. The freeform no longer requires a simple symmetrical configuration but a customized surface texture or design such that when light interacts with the freeform element it can be directed to the desired location without additional elements. The use of such freeform components can reduce the overall number of components necessary to redirect light and thus reduce the overall size of the system.

In accordance with the freeform configuration, many embodiments combine one or more traditional spectrometer elements with freeform optical components to reduce size and maximize functionality of the system. Accordingly, many embodiments of a spectrometer in combination with a telescope may incorporate a slit element 606 that ultimately controls the amount of light that enters the spectrometer and is ultimately received by the detector array. In accordance with many embodiments, slits 606 may take on any number of form and length such that the desired amount of light is reflected within the spectrometer such that the accuracy and overall uniformity of the imaging is maintained. Slits 606 may be optimized base on the desired characteristics and capabilities of spectrometer as well as the coordinating telescope such that the desired output characteristics are maintained. For example, an embodiment illustrated by FIG. 6B shows a slit element 606 having a set slit length 608. However, given the variety of potential operating environments such as space and/or airborne applications, the slit length 608 may range in dimension such that the optimal resolution of the spectrometer can be obtained. For example, some embodiments may utilize a slit with a slit length that is 36 mm while others may be larger such as 48 mm. Other embodiments may have smaller slit lengths that help to maximize the performance of the spectrometer. Furthermore, the other elements in the spectrometer such as the freeform mirror 602 may be optimally designed in order to maintain the output characteristics of the overall system and maintain the capability of accurately detecting point source locations of atmospheric gas plumes. Parameters and characteristics for different configurations can be illustrated in the tables in FIGS. 7A and 7B, further discussed below. While a specific embodiment of a spectrometer is illustrated in FIG. 6A it should be understood that the freeform optics configuration may be applied to any number of spectrometer designs in order to meet the desired parameters and functional characteristics of the overall system. For example, many embodiments may use one or more freeform modified spectrometers depending on the functional characteristics of such. The freeform modified spectrometers may include raster-scan spectrometer, slit scan spectrometers, Littrow-Offner, and/or Dyson type spectrometers.

Turning now to FIGS. 7A-16, design parameters and subsequent results of such designs can be illustrated. For example, FIGS. 7A and 7B illustrate tables of system parameters in accordance with various embodiments. Embodiments that can fit within the specified parameters have an increased ability to detect point source plumes of atmospheric gases with increased accuracy and without the interference of surface spectroscopy. Accordingly, FIG. 7A illustrates various parameters of spectrometers in accordance with embodiments. Such embodiments, include reduce form factor optics as well as increased number of spatial pixels and spectral range and sampling that can allow for a spectral resolution of approximately 1 nm. Many embodiments can have a spectral resolution that is less than 1 nm or less than 3 nm. Additionally, FIG. 7B illustrates various embodiments of system designs that can be implemented in different applications such as airborne and/or space based. Such embodiments can take on different forms and different parameters while still maintaining the desired output characteristics of increased spectral and spatial resolution. Additionally, many embodiments that meet the desired parameters not only can improve the ability to detect methane ($CH_4$) but can allow for improved detection of other atmospheric gases such as carbon dioxide ($CO_2$), carbon monoxide (CO), nitrous oxide ($N_2O$), and water ($H_2O$).

Figure 8:
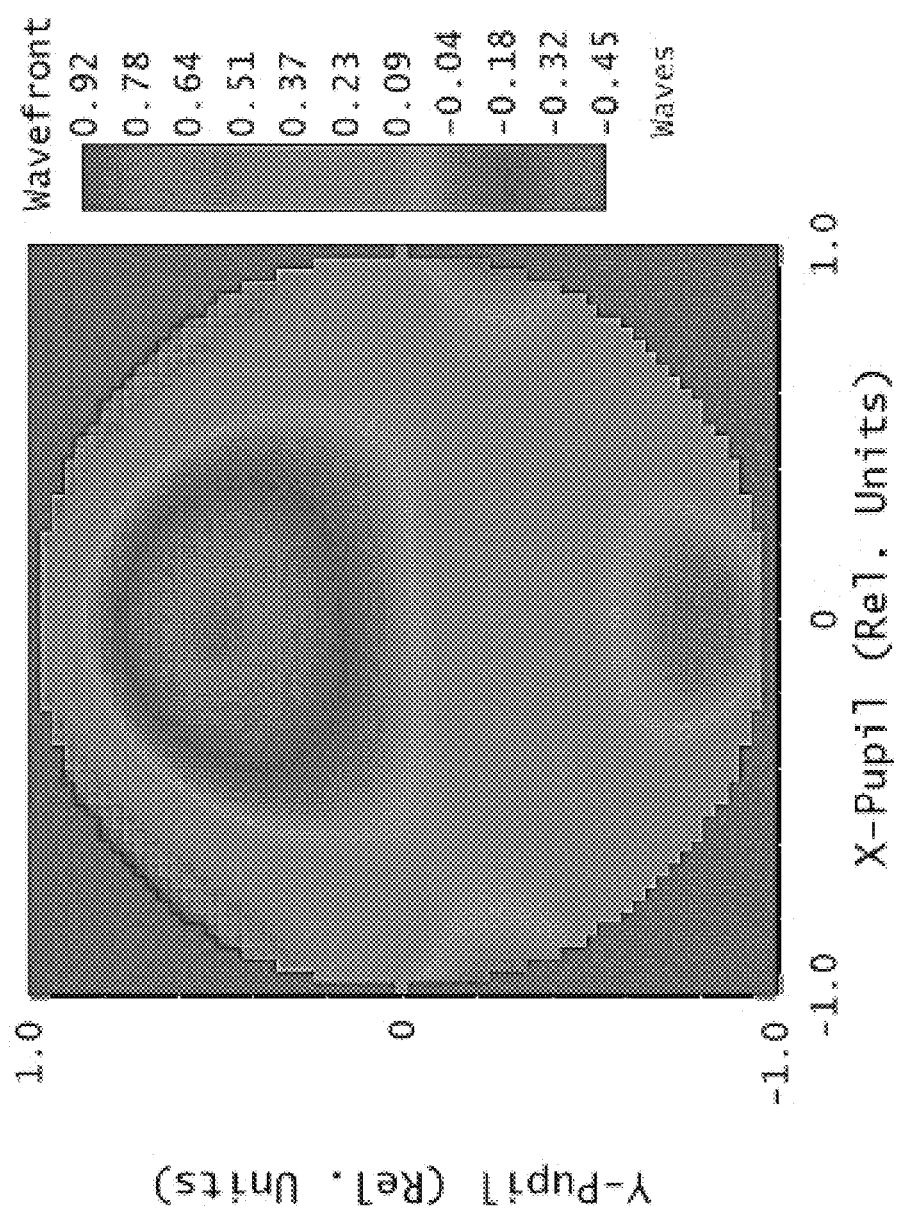
FIG. 8 illustrates a spectrometer alignment of a non-spherical wavefront shape in accordance with embodiments.
Figure 9:
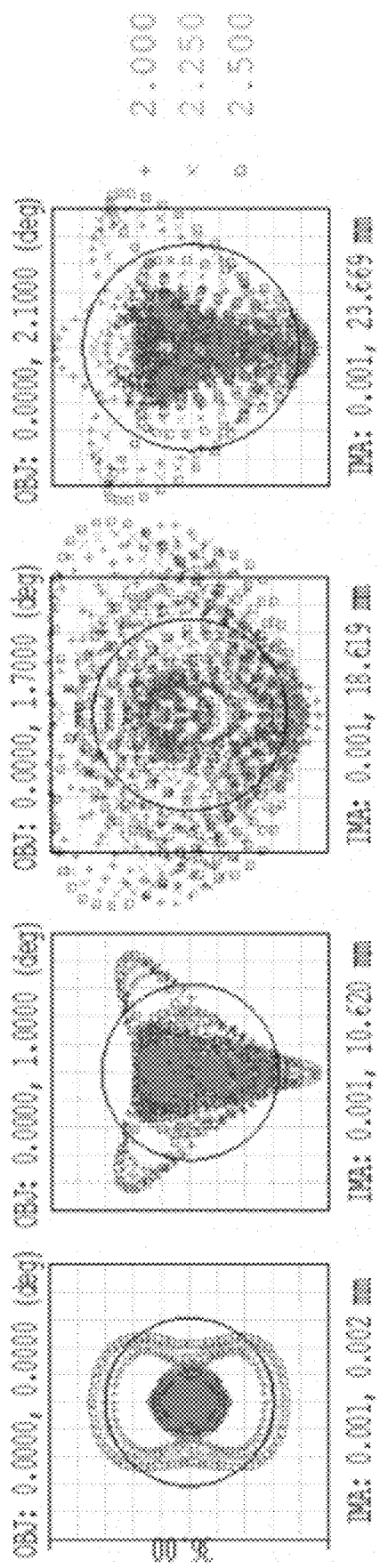
FIG. 9 illustrates various spot diagrams over various wavelengths of telescope element in accordance with embodiments.

FIGS. 8 and 9 illustrate the potential output characteristics that may be possible, in accordance with many embodiments that fall within certain parameters. For example, FIG. 8 illustrates the non-spherical wavefront shape that can be produced from the freeform surfaces used in many embodiments. Likewise, FIG. 9 illustrates the spot diagrams of telescopic ray traces across different wavelengths, in accordance with some embodiments. The spot diagrams help to determine the ability of the optical components to adequately redirect light rays to the desired location. Accordingly, many embodiments offer improved functionality and reduced form factor that can also produce desirable spot diagrams. Spot diagrams, in accordance with embodiments illustrated in FIG. 9, may be based on a 600 mm F/4 Cassegrain telescope across three different wavelengths. For example the boxes in FIG. 9 are equal to a 36_m pixel where the circle shows the Airy disk diameter on an F/4 system design.

Figure 11:
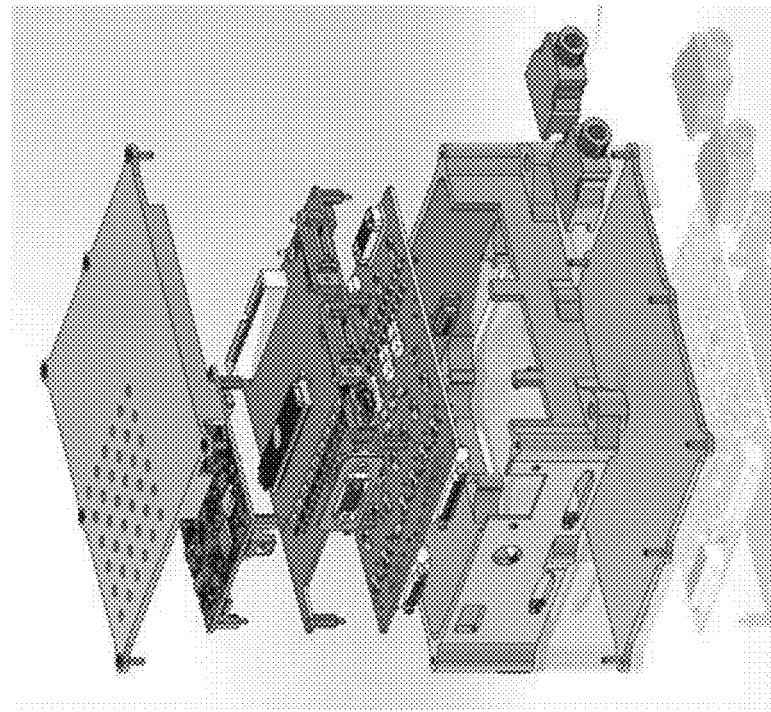
FIG. 11 illustrates a modified electronic equipment configuration in accordance with embodiments.
Figure 10:
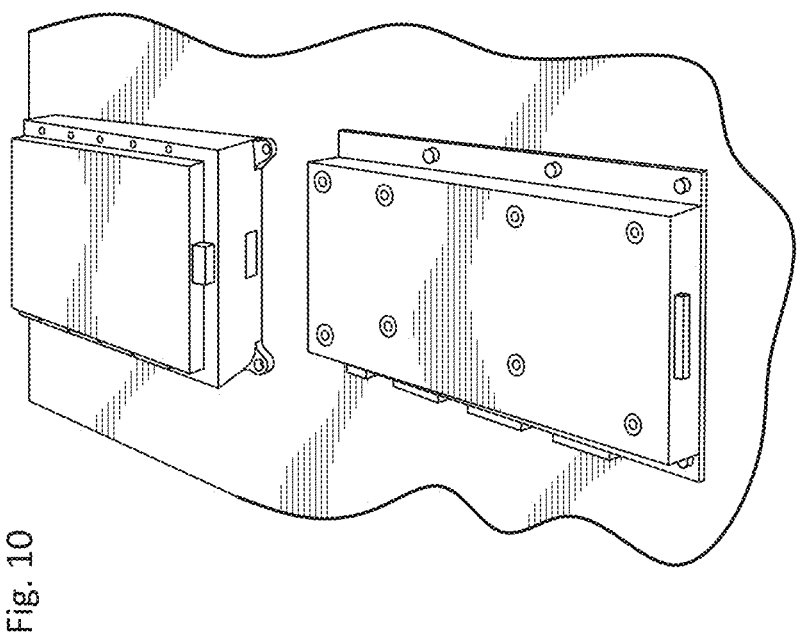
FIG. 10 illustrates an electronic equipment configuration in accordance traditional methods known in the art.
Figure 12:
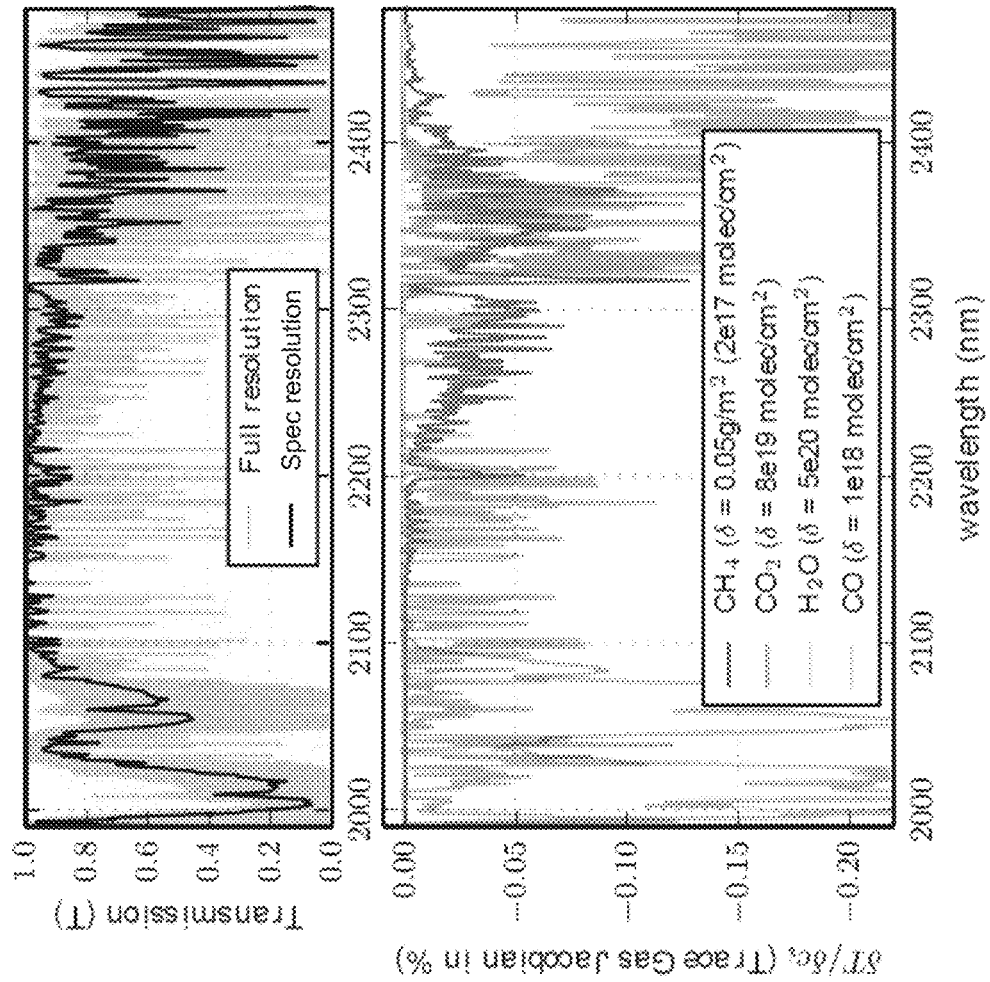
FIG. 12 is a graphical illustration of the spectral resolution capabilities of spectrometer in accordance with embodiments.

The reduction of form factor has been highly sought after in many fields of science to allow for increase applications on delivery devices such as CubSats, aircraft, and/or remote controlled drones. Likewise, many embodiments aim to further reduce the form factor by capitalizing on improved electronic configurations. Some embodiments, for example, may use a CHROMA-D digital output focal plane array to help eliminate/reduce the need for additional analog to digital electronics. FIGS. 10 and 11 illustrate the potential consolidation of on board electronics that can consolidate two boxes (FIG. 10) to a single electronic box (FIG. 11) such that the overall volume can be reduced in as much as 30-50% in accordance with some embodiments. Such improvements in the focal plane array helps to simplify the electronic requirements, reduces the volume by up to 50%, allows for higher frame-rates, and offers large pixel sizes with 3000 elements in the spatial and 500 in the spectral domains. Such embodiments allow for the ability to meet the signal to noise requirements as well as the increased resolution requirements for detecting atmospheric gases. Although a certain configuration is illustrated, it should be understood that various configurations and improvements in electronic output devices can be used to further improve the compactability and functionality of the overall system Turning now to FIG. 12, a graphical illustration of a measurement can be shown. In many embodiments the measurement illustrates a high spectral resolution for an imaging spectrometer that can break the scale gap necessary to separate individual trace gases. The lower graph illustrates the associated Jacobians, which become linearly independent. In many embodiments, the surface features that tend to be problematic will have little effect since absorption features for individual trace gases can be distinct from surface spectroscopy. Additionally, many embodiments can allow for distinct detection and measurement of other gasses such as $CO_2$, CO, $H_2O$, and/or $N_2O$.

Figure 13:
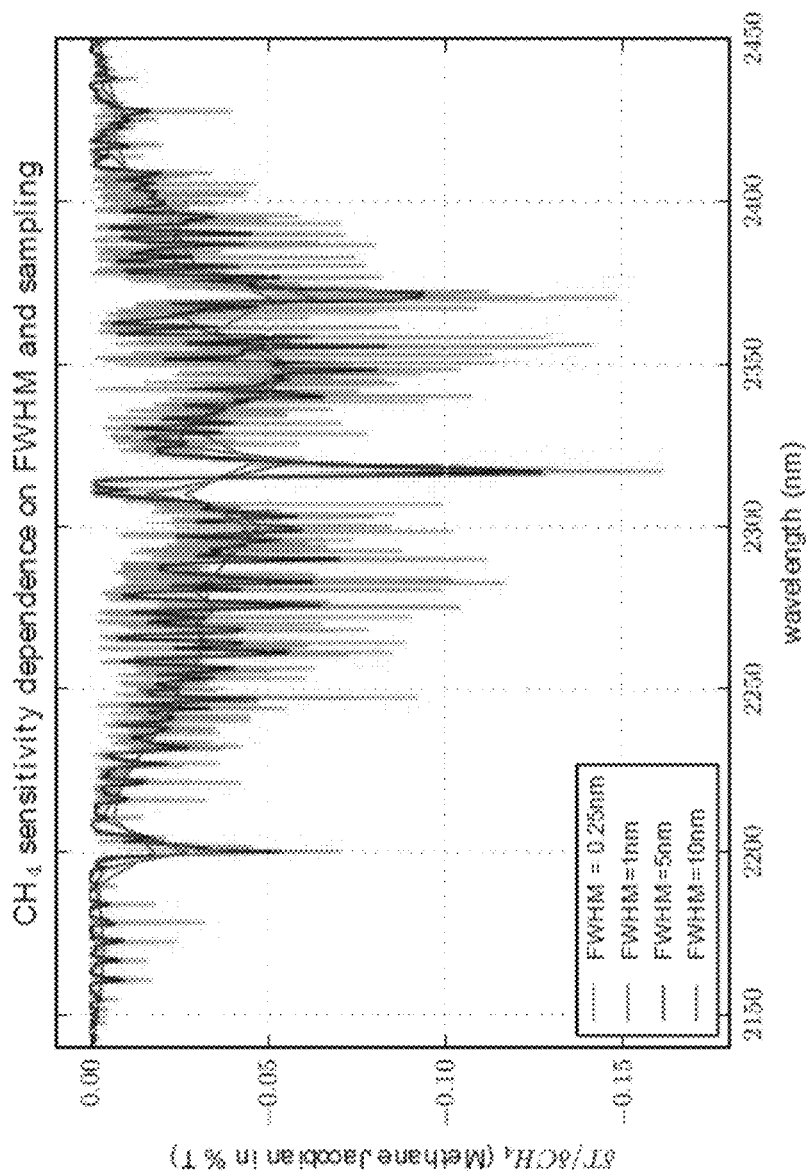
FIG. 13 is a graphical illustration of measured transmission with respect to changes in atmospheric $CH_4$ in accordance with embodiments.

FIG. 13 further illustrates the change in atmospheric transmission with respect to the change in gas concentration for methane at different spectral resolutions. For example, at 10 and 5 nm spectral resolutions it can be difficult to accurately discern atmospheric methane absorptions from surface spectroscopy which can cause spurious signals. However, in accordance with many embodiments, systems and methods for increased spectral resolution (1 nm) can more distinctly detect the methane band at a desired wavelength. As illustrated in FIG. 13 the Jacobians are significantly improved at finer spectral resolution between 0.25 and 1 nm.

Figure 14:
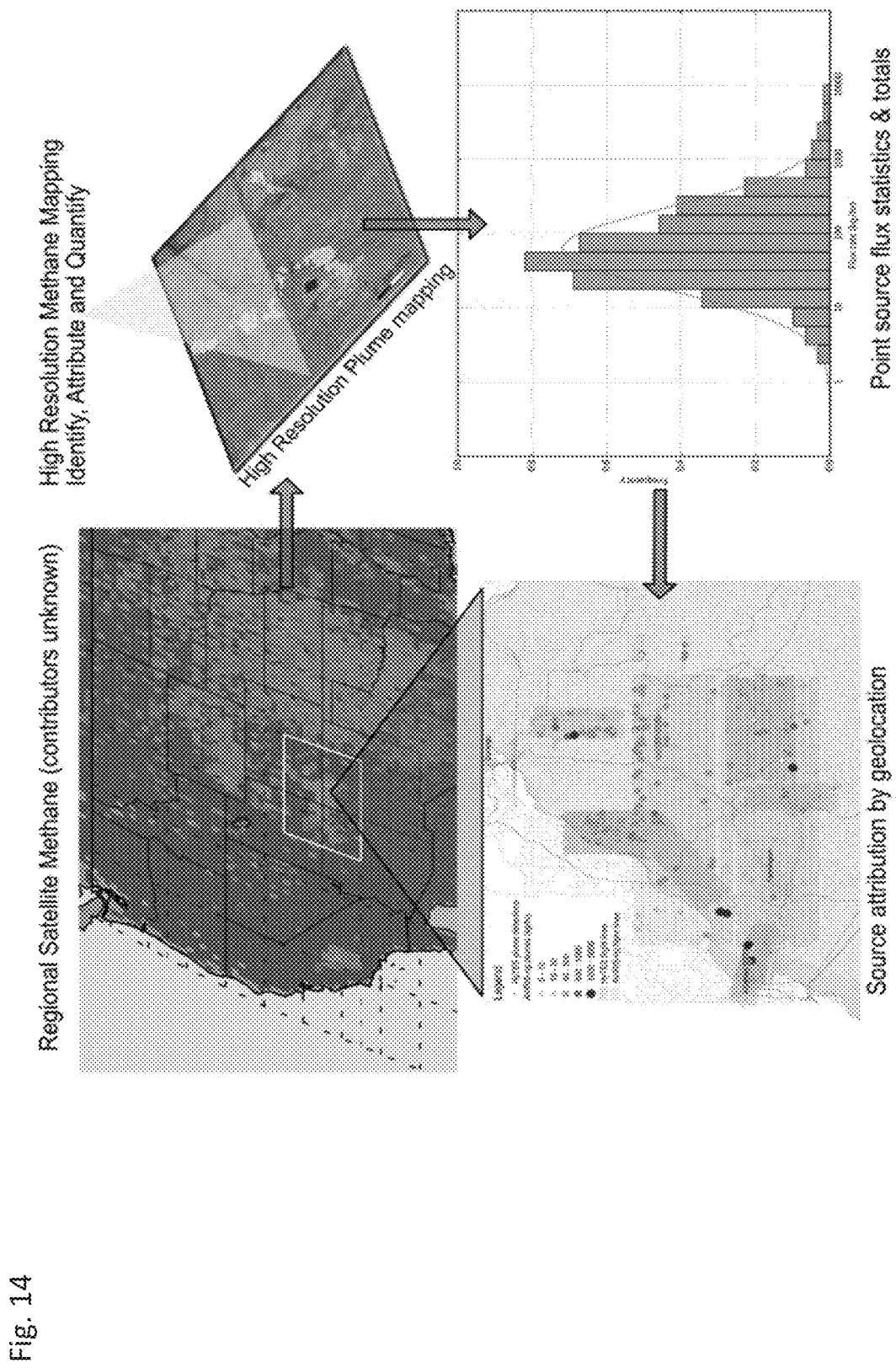
FIG. 14 illustrates a method of sampling $CH_4$ emissions in accordance with embodiments.

Turning now to FIG. 14, systems and methods for detecting point source emissions of atmospheric gases can be illustrated. FIG. 14 (upper left) illustrates an example of a tiered observation strategy where a large regional hot spot was discovered using atmospheric measurements obtained from the SCIAMACHY instrument (high spectral resolution, low spatial resolution). An imaging spectrometer then was used to map the region and identify individual point sources (upper right) and estimate emission rates (bottom right). By mapping a large region with imaging spectrometers, the locations of many point sources are determined and a regional emission estimate can be generated. In accordance with some embodiments, tiered strategies may be desirable to identify regions that merit measurement by imaging spectrometers to pinpoint individual emission sources.

Figure 15:
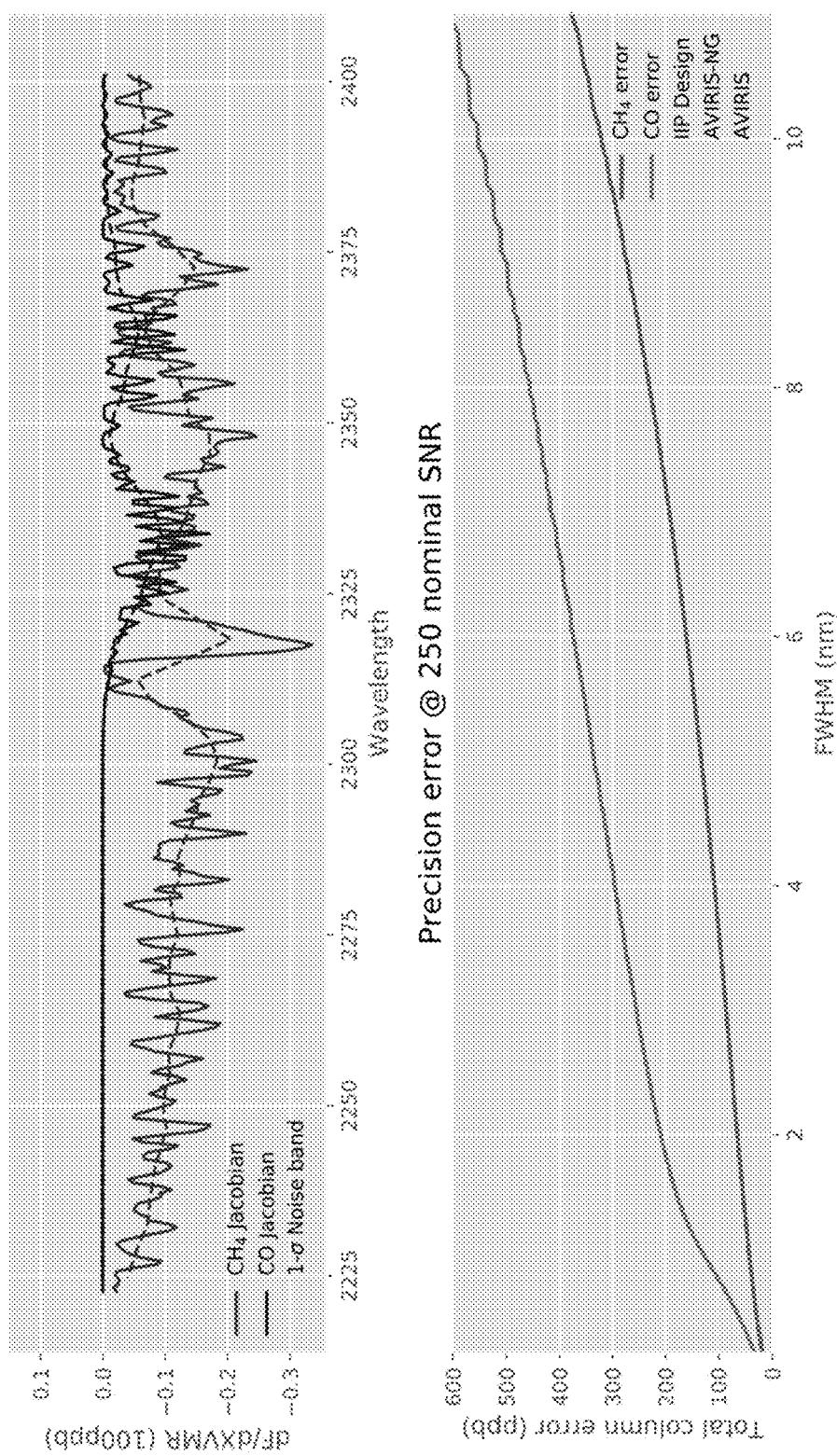
FIG. 15 is a graphical illustration of sensitivity analysis in accordance with embodiments.
Figure 16:
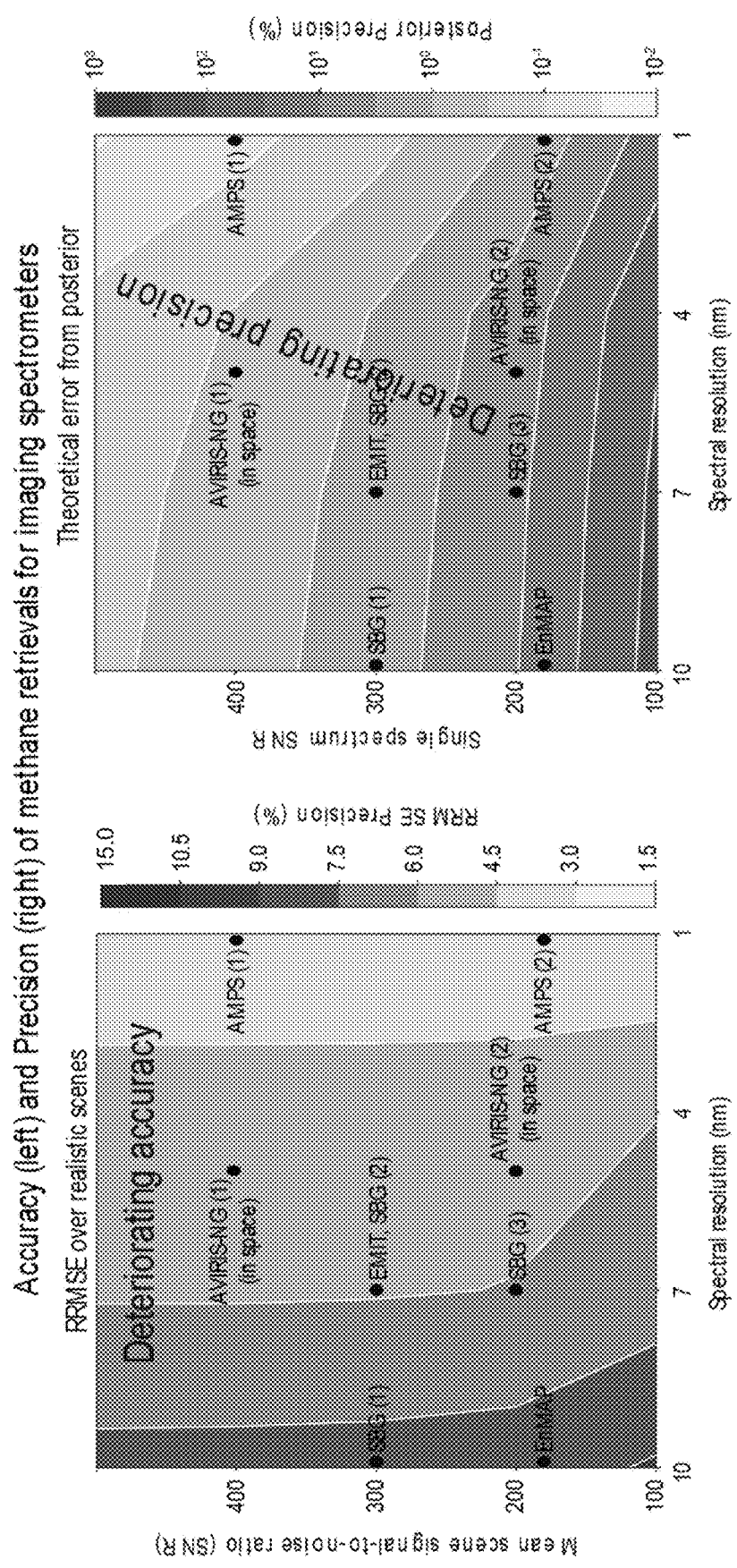
FIG. 16 is a graphical illustration of gas retrieval precision in accordance with known art.

The improved sensitivity of embodiments of the invention can be further illustrated in the graphs of FIG. 15. FIG. 14 illustrates a sensitivity analysis between embodiments and current state of the art imaging spectrometers. Spectral resolutions better than 1.5 nm dramatically improves the ability to resolve CO lines, thus helping to reduce systematic biases and thus, improve detection and measurement of other atmospheric gases such as $CH_4$. Additionally, FIG. 16 illustrates systematic retrieval errors (left) as well as theoretical position errors (right) from various imaging spectrometers. It can be illustrated that imaging spectrometers would require higher spectral resolution in order to avoid the potential interference from surface features. For example, as previously mentioned existing imaging spectrometers such as AVIRIS and AVIRIS-NG were designed to measure surface spectroscopy with a moderate spectral resolution and are ill suited for accurate measurement and retrieval of atmospheric gases such as $CH_4$. FIGS. 7A and 7B illustrate that embodiments must set forth improved spectral resolution in order to accurately retrieve and measure atmospheric gases. Many embodiments offer improved spectral resolution that allow for measurement of gases such as $CH_4$ but also $CO_2$, CO, $H_2O$, and $N_2O$.

Doctrine of Equivalents

As can be inferred from the above discussion, the above-mentioned concepts can be implemented in a variety of arrangements in accordance with embodiments of the invention. Specifically, many embodiments capitalize on a non-traditional combination of telescopic imaging and spectrometer designed to increase spectral and spatial resolution of imaging systems. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An imaging system comprising:
   a telescopic component having a plurality of reflective and refractive elements disposed within a body of the telescopic component such that the reflective and refractive elements receive light images from a desired location wherein the light images are in the form of light rays transmitted through the telescopic component and wherein at least one of the refractive elements is a lens with a freeform surface;
   a spectrometer optically coupled to the telescopic component and further comprising one or more spectral reflective elements that receive the light from the telescopic element and redirect the light to a detector array such that the imaging system operates within a spectral frequency range, wherein at least one of the spectral reflective elements has a freeform reflective surface, and wherein the detector array further comprises a number of pixels corresponding to a spatial resolution that is detected from the telescopic component such that the spatial resolution can result in an optimized image; and
   a focal plane array comprising a plurality of electronic components disposed within a housing and electro-optically connected to the spectrometer and configured to receive light image data from the optically connected telescope and spectrometer and convert the light image data into a data stream; wherein
   the imaging system has a spectral resolution of 1 nm and a spatial resolution selected from a group consisting of less than 30 m and between 10 and 30 m.

2. The imaging system of claim 1, wherein the system is configured to detect atmospheric gases.

3. The imaging system of claim 2, wherein the atmospheric gases are selected from a group consisting of $CH_4$, $CO_2$, CO, $N_2O$, and $H_2O$.

4. The imaging system of claim 3, wherein the system is configured to determine point source locations by way of the incoming light images of a point source plume of the atmospheric gas.

5. The imaging system of claim 1, where in the spectrometer is selected from a group consisting of Littrow, Littrow-Offner, Dyson type, slit-scan, and raster scan.

6. The imaging system of claim 1, wherein the focal plan array is a CHROMA-D focal plane array.

7. The imaging system of claim 1, wherein the system is configured to fit within a form factor of a CubeSat.

8. The imaging system of claim 1, wherein the system is configured to fit within a form factor of a SmallSat.

9. The imaging system of claim 1, wherein the number of spatial pixels is selected from a group consisting of 600, 1240, and 2400.

10. The imaging system of claim 1, wherein the spectral frequency range is from 1990 to 2400.

11. The imaging system of claim 1, wherein the spectral frequency range is from 2000 to 2400.

12. The imaging system of claim 1, wherein the refractive elements of the telescopic element make up a refractive corrector that redirects or corrects incoming light ray paths to a desired path within the telescopic component.

13. The imaging system of claim 1, wherein the system is disposed on an spaceborne or airborne transportation device and configured to receive light images along a predetermined flight path.

14. A method for detecting atmospheric gases comprising:
    utilizing an imaging system wherein the imaging system further comprises
       a telescopic component having a plurality of reflective and refractive elements disposed within a body of the telescopic component such that the reflective and refractive elements receive light images from a desired location wherein the light images are in the form of light rays transmitted through the telescopic component and wherein at least one of the refractive elements is a lens with a freeform surface;
       a spectrometer optically coupled to the telescopic component and further comprising one or more spectral reflective elements that receive the light from the telescopic element and redirect the light to a detector array such that the imaging system operates within a spectral frequency range, wherein at least one of the spectral reflective elements has a freeform reflective surface, and wherein the detector array further comprises a number of pixels corresponding to a spatial resolution that is detected from the telescopic component such that the spatial resolution can result in an optimized image; and a focal plane array comprising a plurality of electronic components disposed within a housing and electro-optically connected to the spectrometer and configured to receive light image data from the optically connected telescope and spectrometer and convert the light image data into an analog data stream; wherein the imaging system has a spectral resolution of less them 3 nm and a spatial resolution selected from a group consisting of less than 30 m and between 10 and 30 m;

obtaining images with the imaging system wherein the images are obtained from a portion of the earth along a flight path;

analyzing the obtained images from the spectrometer and focal plane array for the detection of atmospheric gas plumes; and utilizing the analyzed images in determining the point source location of the atmospheric gas plumes.

15. The method of claim 14, wherein the atmospheric gases are selected from a group consisting of $CH_4$, $CO_2$, CO, $N_2O$, and $H_2O$.

16. The method of claim 14, where in the spectrometer is selected from a group consisting of Littrow, Littrow-Offner, Dyson type, slit-scan, and raster scan.

17. The method of claim 14, wherein the focal plan array is a CHROMA-D focal plane array.

18. The method of claim 14, wherein the system is configured to fit within a form factor selected from a group consisting of a CubeSat and a Small Sat.

19. The method of claim 14, wherein the number of spatial pixels is selected from a group consisting of 600, 1240, and 2400.

20. The method of claim 14, wherein the spectral frequency range is selected from a group consisting of 1990 to 2400 and 2000 to 2400.

* * * * *